(12) United States Patent
Grondin et al.

(10) Patent No.: US 9,479,912 B2
(45) Date of Patent: Oct. 25, 2016

(54) TRANSPORTABLE TELECOMMUNICATION INTERCONNECTION DEVICE

(71) Applicant: Telflex Technologie Inc., Levis (CA)

(72) Inventors: Jean-Philippe Grondin, Sainte-Helene-de-Breakeyville (CA); Martin Gagnon, Saint-Nicolas (CA)

(73) Assignee: Telflex Technologies, Inc., Levis (CA)

( * ) Notice: Subject to any disclaimer, the term of this patent is extended or adjusted under 35 U.S.C. 154(b) by 0 days.

(21) Appl. No.: 14/390,125

(22) PCT Filed: Apr. 3, 2013

(86) PCT No.: PCT/CA2013/000319
§ 371 (c)(1),
(2) Date: Oct. 2, 2014

(87) PCT Pub. No.: WO2013/149326
PCT Pub. Date: Oct. 10, 2013

(65) Prior Publication Data
US 2015/0056980 A1 Feb. 26, 2015

Related U.S. Application Data

(60) Provisional application No. 61/619,582, filed on Apr. 3, 2012.

(51) Int. Cl.
*H04W 4/18* (2009.01)
*H04M 3/30* (2006.01)
*H04W 88/14* (2009.01)

(52) U.S. Cl.
CPC .............. *H04W 4/18* (2013.01); *H04M 3/308* (2013.01); *H04W 88/14* (2013.01)

(58) Field of Classification Search
CPC ... H04W 92/02; H04W 88/06; H04W 88/02; H04W 76/02; H04W 4/02; H04W 88/181; H04W 88/14
USPC ...................................................... 455/552.1
See application file for complete search history.

(56) References Cited

U.S. PATENT DOCUMENTS 4,658,422 A 4/1987 Sparks
5,201,415 A 4/1993 Metz
(Continued)

FOREIGN PATENT DOCUMENTS

CA 2011703 9/1991
CA 1292206 11/1991
(Continued)

OTHER PUBLICATIONS

International Search Report for PCT/CA2013/000319, dated Jun. 6, 2013.
(Continued)

*Primary Examiner* — Kashif Siddiqui
(74) *Attorney, Agent, or Firm* — Wiggin and Dana LLP; Gregory S. Rosenblatt; Andrew D. Bochner (57) ABSTRACT

A transportable telecommunication interconnection device for interconnecting a plurality of communication devices to a telecommunication network, comprising: a transportable enclosure comprising an end wall and a peripheral wall extending along an axis from the end portion and defining a chamber, the transportable enclosure further comprising a separation wall positioned within the chamber at a given position along the axis to define an enclosed compartment and an open compartment within the chamber; a chamber cover for removably closing the open compartment; input and output port connectors extending through at least one wall defining the enclosed compartment, the input port connectors for connection to the communication network and the output port connectors for connection to the plurality of communication devices; and a processing device positioned within the enclosed compartment, connected to the input and output ports, and configured for interconnecting the input port connectors to the output port connectors.

21 Claims, 12 Drawing Sheets

(56) References Cited

U.S. PATENT DOCUMENTS

| | | | |
|---|---|---|---|
| 6,763,226 B1 | 7/2004 | McZeal, Jr. | |
| 7,564,919 B2 | 7/2009 | Moshavi | |
| 8,126,442 B2 | 2/2012 | Wolfe | |
| 2005/0189132 A1 | 9/2005 | Stoller | |
| 2005/0199459 A1* | 9/2005 | Harvey | A45C 5/14 190/108 |
| 2010/0008369 A1* | 1/2010 | Pan | H04W 40/00 370/401 |
| 2011/0243064 A1 | 10/2011 | McManus et al. | |
| 2012/0034954 A1 | 2/2012 | Tabe | |
| 2013/0070610 A1* | 3/2013 | Buchholz | H04W 84/10 370/241 |

FOREIGN PATENT DOCUMENTS

| | | |
|---|---|---|
| CA | 2059079 | 2/1996 |
| CA | 2180739 | 5/1996 |
| CA | 2208189 | 12/1997 |
| CA | 2272475 | 1/1998 |
| CA | 2240153 | 12/1998 |
| CA | 2228359 | 7/1999 |
| CA | 2256116 | 7/1999 |
| CA | 2304567 | 2/2000 |
| CA | 2329547 | 6/2001 |
| CA | 2352323 | 12/2001 |
| CA | 2375636 | 9/2002 |
| CA | 2439984 | 9/2002 |
| CA | 2436946 | 10/2002 |
| CA | 2440451 | 10/2002 |
| CA | 2484423 | 12/2002 |
| CA | 2484711 | 11/2003 |
| CA | 2491285 | 1/2004 |
| CA | 2508555 | 6/2004 |
| CA | 2627896 | 5/2007 |
| CA | 2582849 | 9/2007 |
| CA | 2686602 | 11/2007 |
| CA | 2593438 | 1/2008 |
| CA | 2695947 | 2/2009 |
| CA | 2729746 | 1/2010 |
| CA | 2681558 | 4/2010 |
| CA | 2751645 | 8/2010 |
| CA | 2723202 | 10/2011 |

OTHER PUBLICATIONS

Supplemental European Search Report of EP 13 77 3007.

* cited by examiner

TRANSPORTABLE TELECOMMUNICATION INTERCONNECTION DEVICE

CROSS REFERENCE TO RELATED APPLICATIONS

This application is a United States national-phase application pursuant to 35 U.S.C. §371, claiming benefit of international PCT Application No. PCT/CA2013/000319, titled "TRANSPORTABLE TELECOMMUNICATION INTERCONNECTION DEVICE" that was filed Apr. 3, 2013, which claims the benefit of Provisional Patent Application No. 61/619,582, filed on Apr. 3, 2012. The disclosures of application serial numbers PCT/CA2013/000319 and 61/619,582 are incorporated by reference herein in their entirety.

FIELD OF THE INVENTION

The invention relates to the field of information technology. More precisely, this invention pertains to a transportable telecommunication system.

BACKGROUND

When a disaster occurs, it becomes important to promptly establish/reestablish communications networks for obvious reasons. In particular, it becomes crucial to give access to a plurality of communication devices such as wireless phones, digital key phones, etc.

Unfortunately, giving access to a plurality of devices may become cumbersome for various reasons.

For instance, configuring a communication system may require professional skills. The complexity may be due to the fact that many interconnection cables may be required for performing all the connections. An operator may therefore commit errors that will translate into a waste of time. Also, installing and removing a communication system will be time-consuming since all elements will have to be removed from a package and put back later on in the package.

Furthermore, configuring the communication system may be required.

Additional yet expensive resources such as a technician or an engineer may be required to do the installation.

Such limitations are also found when a temporary office must be setup. Resources and time must be allocated.

There is a need for a method and device that will overcome at least one of the above-identified drawbacks.

Features of the invention will be apparent from review of the disclosure, drawings and description of the invention below.

BRIEF SUMMARY

According to a first broad aspect, there is provided a transportable telecommunication interconnection device for interconnecting a plurality of communication devices to a telecommunication network, comprising: a transportable enclosure comprising an end wall and a peripheral wall extending along an axis from the end portion and defining a chamber, the transportable enclosure further comprising a separation wall positioned within the chamber at a given position along the axis to define an enclosed compartment and an open compartment within the chamber; a chamber cover for removably closing the open compartment; input and output port connectors extending through at least one wall defining the enclosed compartment, the input port connectors for connection to the communication network and the output port connectors for connection to the plurality of communication devices; and a processing device connected to the input and output ports and configured for interconnecting the input port connectors to the output port connectors.

In one embodiment, the chamber cover is hingedly secured to the transportable enclosure.

In one embodiment, the chamber cover is provided with a recess, the recess facing the open compartment when the chamber cover is removably secured to the transportable enclosure.

In one embodiment, the recess is sized and shaped for receiving one of a router and an antenna combiner to be operatively connected to the processing device.

In one embodiment, at least one of the output port connector is adapted for connection to a data network.

In one embodiment, the communication devices comprise at least one of an analog phone, a digital key phone, an IP phone, and a two-way radio.

In one embodiment, the input and output port connectors extend through the separation wall.

In another embodiment, the input and output port connectors extend through the end wall.

In one embodiment, the transportable telecommunication interconnection device further comprises a further cover removably securable on top of the end wall for protecting the input and output port connectors.

In one embodiment, the transportable telecommunication interconnection device further comprises a tray member removably insertable within the open compartment.

In another embodiment, the transportable telecommunication interconnection device further comprises a tray member fixedly secured within the open compartment.

In one embodiment, the tray member comprises a plurality of recesses each shaped and sized for receiving at least a respective one of the communication devices.

In one embodiment, the transportable enclosure is further provided with wheels.

In one embodiment, the transportable enclosure is further provided with at least one handle.

In one embodiment, the processing device is configured for converting telecommunication formats.

In one embodiment, the processing device is pre-configured.

In another embodiment, the processing device is remotely configurable upon connection to the telecommunication network.

In one embodiment, the telecommunication network comprises one of a mobile network, a Public Switching Telephone Network, an Internet Protocol network, an Integrated Services Digital Network, and a Basic Rate Interface Network.

According to another broad aspect, there is provided a transportable telecommunication interconnection system for interconnection to a telecommunication network, comprising: a plurality of communication devices; a transportable enclosure comprising an end wall and a peripheral wall extending along an axis from the end portion and defining a chamber, the transportable enclosure further comprising a separation wall positioned within the chamber at a given position along the axis to define an enclosed compartment and an open compartment within the chamber; a chamber cover for removably closing the open compartment; input and output port connectors extending through at least one wall defining the enclosed compartment, the input port connectors for connection to the communication network and the output port connectors for connection to the plurality of communication devices; and a processing device configured for interconnecting the input ports to the output ports.

In one embodiment, the transportable telecommunication interconnection system further comprises a tray member removably insertable within the open compartment, the tray member comprising a plurality of recesses each shaped and sized for receiving at least a respective one of the communication devices.

According to a further broad aspect, there is provided a method for interconnecting a communication device to a telecommunication network, comprising: providing a transportable telecommunication interconnection device comprising: a transportable enclosure comprising an end wall and a peripheral wall extending along an axis from the end portion and defining a chamber, the transportable enclosure further comprising a separation wall positioned within the chamber at a given position along the axis to define an enclosed compartment and an open compartment within the chamber; a chamber cover for removably closing the open compartment; input and output port connectors extending through at least one wall defining the enclosed compartment, the input port connectors for connection to the communication network and the output port connectors for connection to the plurality of communication devices; and a processing device connected to the input and output ports and configured for interconnecting the input port connectors to the output port connectors; connecting the telecommunication network to a respective one of the input port connectors; and connecting the communication device to one of a respective one of the output port connectors.

In one embodiment, the transportable telecommunication device/system disclosed is that the communication system is hidden from the user which may be of great advantage since it removes the complexity of having to preset the telecommunication system.

In one embodiment, another advantage of the transportable telecommunication interconnection device/system disclosed herein is that a user has only access to a minimum amount of elements. In fact, users do not need to have extensive skills for operating the transportable telecommunication system.

BRIEF DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION

In the following description of the embodiments, references to the accompanying drawings are by way of illustration of an example by which the invention may be practiced. It will be understood that other embodiments may be made without departing from the scope of the invention disclosed.

Figure 1:
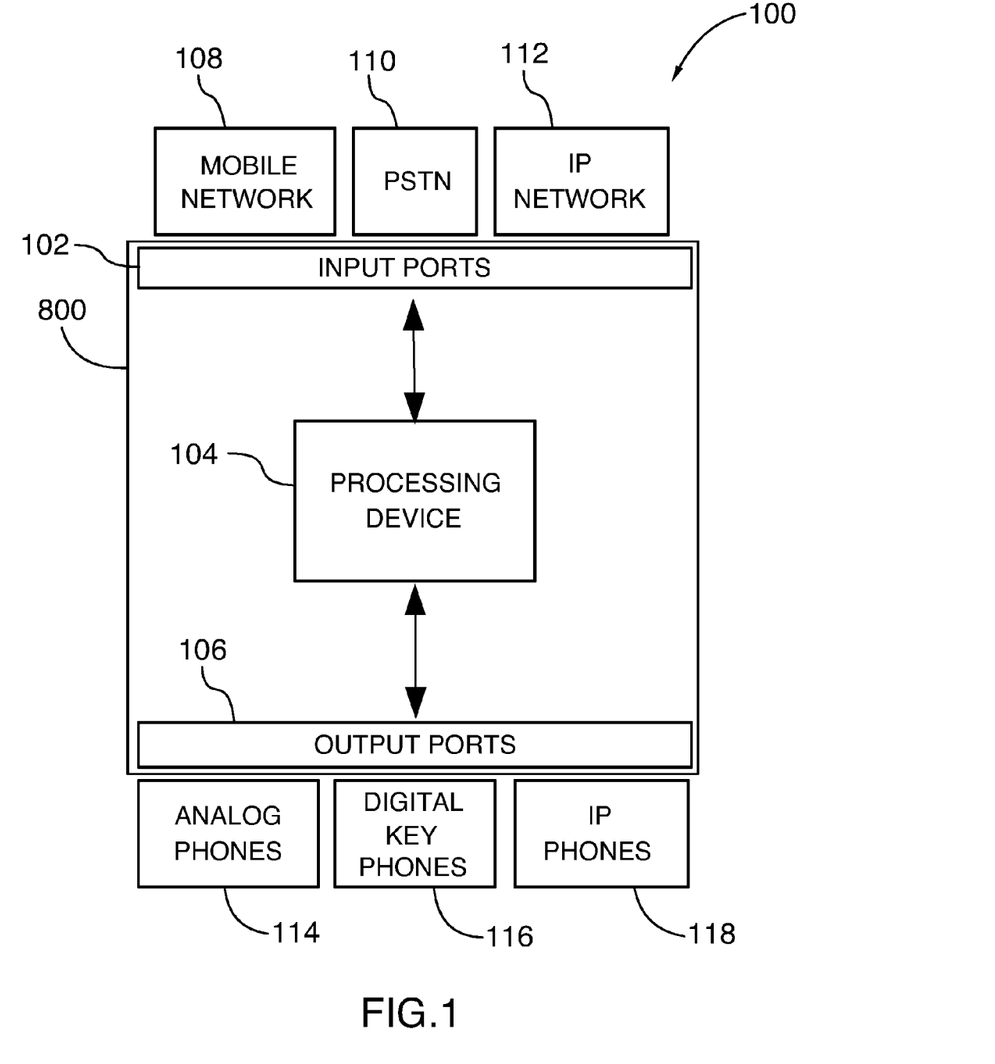
FIG. 1 is a block diagram illustrating a transportable telecommunication interconnection device, in accordance with an embodiment.

Now referring to FIG. 1, there is shown an embodiment of a transportable telecommunication interconnection device 100.

The transportable telecommunication interconnection device 100 comprises input ports connectors 102 for connecting the transportable telecommunication interconnection device 100 to a mobile network 108, a Public Switching Telephone Network (PSTN) 110, an IP network 112, an Integrated Services Digital Network (ISDN) (not shown), and/or a Basic Rate Interface Network (not shown). For example, the input port connectors may comprise a first input connector to a mobile network 108, a second input connector to be connected to a PSTN 110, a third input connector to be connected to an IP network 112, a fourth input connector for connection to the ISDN, and a fifth connector to be connected to the Basic rate Interface Network.

The transportable telecommunication interconnection device 100 further comprises output port connectors 106 for connecting the telecommunication interconnection device 100 to communication devices, which may comprise at least one analog phone 114, at least one digital key phone 116, at least one Internet Protocol (IP) phone 118, at least one two-way radio (not shown), and/or a data network (not shown). For example, the output port connectors 106 may comprise a first output connector to be connected to the analog phone 114, a second output connector to be connected to the digital key phone 116, a third output connector to be connected to the IP phone, and a fourth output connector to be connected to the two-way radio. The output port connectors 106 may further comprise a fourth output port connector to be connected to a data network.

The transportable telecommunication interconnection device 100 further comprises a processing device 104 for operatively interconnecting the input ports 102 with the output ports 106 according to a desired configuration. For example, an adequate connection cable may connect each input and output port connector 102 and 106 to the processing device 104. The processing device 104 may be configured to selectively connect each input port connector to at least one of the communication devices. The processing device 104 may be further configured for converting data format so that data coming from a network 108-112 may be transmitted to a communication device and vice versa. In one embodiment, the processing device 104 is adapted to convert digital data coming from a network 108-112 to analog data when the communication device is analogic, and vice versa.

In one embodiment, the processing device 104 comprises a business telephone system such as a private branch exchange (PBX). The processing device 104 may further comprise a switch and/or a router for interconnecting the input ports and the output ports together, and routing the signals from a given input port to a target output port, and vice versa.

In one embodiment, the processing device 104 is pre-configured so that a user of the transportable telecommunication interconnection device 100 do not have to configure the processing device 104. In an embodiment in which the processing device 104 is a business telephone system, the processing device 104 may be pre-configured so that answering machine functions, speed dialing functions, station-specific limitations such as no long distance access or no paging, selection of signaling sounds, and/or the like are already configured on the processing device 104.

In the same or another embodiment, the processing device 104 is configured so as to be remotely configurable. In this case, upon connection of the transportable telecommunication interconnection device 100 to a network 108-112, an operator may remotely access and configure the processing device 104. It should be understood that the processing device 104 may be pre-configured or not.

In one embodiment, the processing device 104 may be concurrently connected to at least two different networks. In this case, data may be concurrently received by the processing device 104 from the at least two different networks, and the data received from the at least two different network may be processed by the processing device 104 and transmitted to at least a given communication device.

In one embodiment, the processing device 104 is further adapted to detect any transmission problem when connected to a given network. Upon detection of a given problem, the processing device is then adapted to switch the connection to another network so that the change of connection be substantially transparent to the user.

Figure 2:
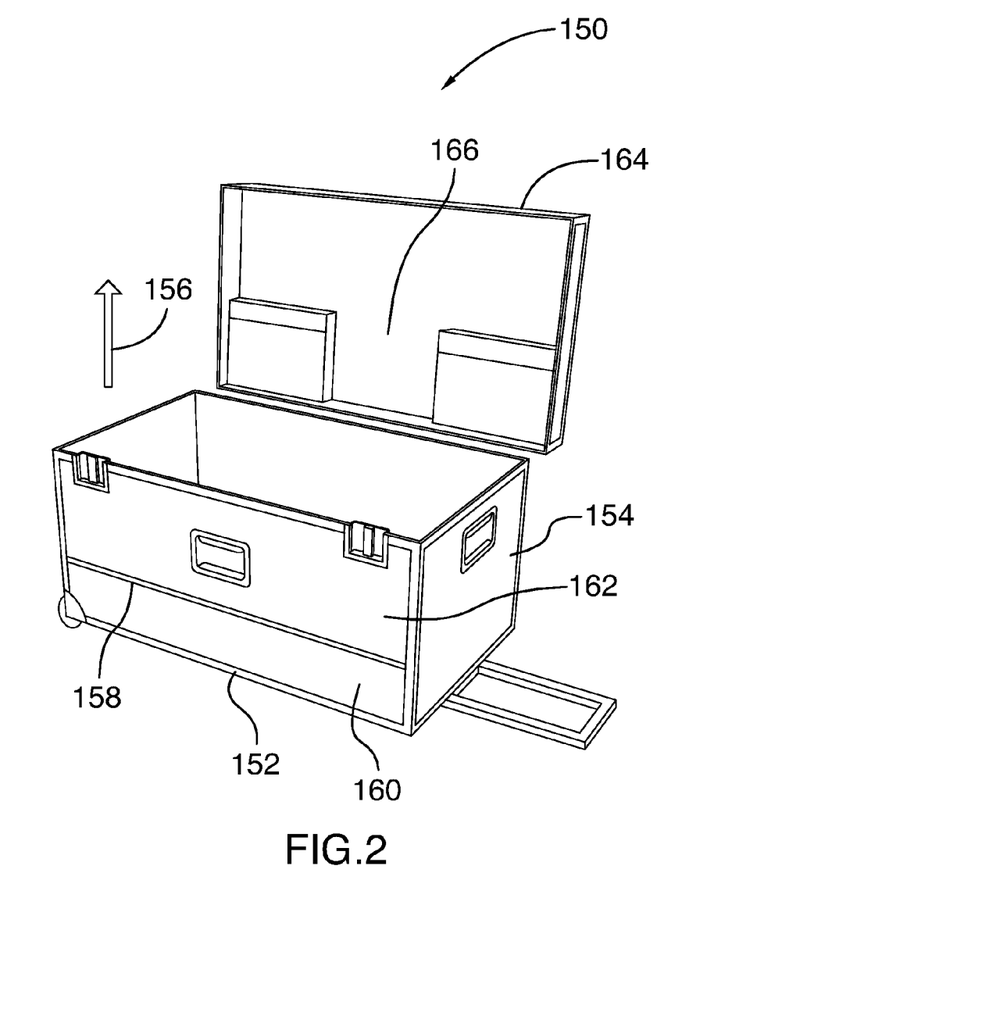
FIG. 2 is a schematic illustrating a transportable enclosure for receiving an interconnection system, in accordance with an embodiment.

The transportable telecommunication system 100 further comprises a transportable enclosure for receiving at least the processing device 104 therein, of which one embodiment 150 is illustrated in FIG. 2.

The transportable enclosure 150 comprises a bottom wall 152 and a peripheral wall 154 which extends from the bottom wall along an axis 156. The peripheral wall 154 is mode of four wall portions assembled together to form a rectangular peripheral wall 154. It should be understood that the shape of the bottom and peripheral walls is exemplary only. For example, the bottom and peripheral walls 152 and 154 may have square shape, an octagonal shape, etc. The bottom and peripheral wall 152 and 154 define a chamber in which at least the processing device 104 is to be positioned.

The transportable enclosure 150 further comprises a separation wall 158 positioned within the chamber at a given position along the axis 156 to divide the chamber into two compartment 160 and 162. The compartment 160 extends from the base wall 152 to the separation member 158, and the compartment 162 extends above the separation member 158. The position of the separation member or wall 158 within the chamber is chosen so that the processing device 104 be inserted into the compartment 160. The skilled addressee will appreciate that the separation member 158 may be of various size, shape and material.

In one embodiment, the separation member or wall 158 is fixedly secured to the peripheral wall 154. In this case, the processing device 104 is first positioned within the chamber, and then the separation wall 158 is secured to the peripheral wall. In another embodiment, the separation wall 160 is removably secured to the peripheral wall.

A cover 164 is further provided in order to removably close the chamber of the transportable enclosure 150. The cover is removably securable to the top end of the peripheral wall 154 in order to close the transportable enclosure 150. For example, the cover 164 may be hingedly secured to the top end of the peripheral wall 154.

In one embodiment, the cover 164 may be provided with a recess 166 in its face facing the chamber of the transportable enclosure 150 when removably secured thereto. For example, the recess 166 forming a third compartment may be shaped and sized to receive therein at least one of a router, an antenna combiner, an antenna, an antenna coupler, and/or the like, that are operatively connected to the processing device 104. The antenna combiner may be used for connecting more than one cellular radio to a single antenna of better characteristics in order to obtain better performance. A signal booster may further be present for increasing the reception of the antenna. The skilled addressee will appreciate that the antenna combiner may be used also in order to offer a better stability and an identical signal for each transmitter. It should also be understood that the transportable telecommunication interconnection device may also be connected to an external antenna.

In one embodiment, a further separation wall may be provided to close the recess 166 and enclose therein any adequate piece of equipment, as described below.

The second compartment 162 is sized for receiving at some of the communication devices such as at least one of a group of analog phones, a group of digital key phones and a group of IP phones.

In one embodiment, the separation wall 158 is made of an opaque material and is sized so that its surface area substantially correspond to the cross-sectional surface area of the chamber of the transportable enclosure 150. As a result, the first compartment 160 is hidden from a user of the device 100 when the separation wall 158 is secured within the chamber.

In one embodiment, hiding the first compartment 160 comprising the processing device 104 and the connection cables for connecting the processing device 104, from the user is of great advantage since it removes from the sight of a user the complexity of the interconnections. Moreover, the use of a separation wall 158 is of great advantage since it may be used to support pieces of equipment that may be readily accessed after opening the transportable enclosure, connecting and configuring the transportable telecommunication system.

At least one wall of the compartment 160 is provided with apertures therethrough for receiving the input/output port connectors. The walls of the compartment 160 comprise the base wall 152, the separation wall 158, and the portion of the peripheral wall 154 that is comprised between the base wall 152 and the separation wall 158. It should be understood that some of the input/output port connectors may be secured to a given wall of the compartment 160 while other input/ output port connectors may be secured to at least another wall of the compartment 160.

In one embodiment, the transportable enclosure 150 may comprise a plurality of wheels and at least one handle for the purpose of easily displacing the transportable enclosure 150. For example, the transportable enclosure 150 may comprise a retractable handle.

Figure 3:
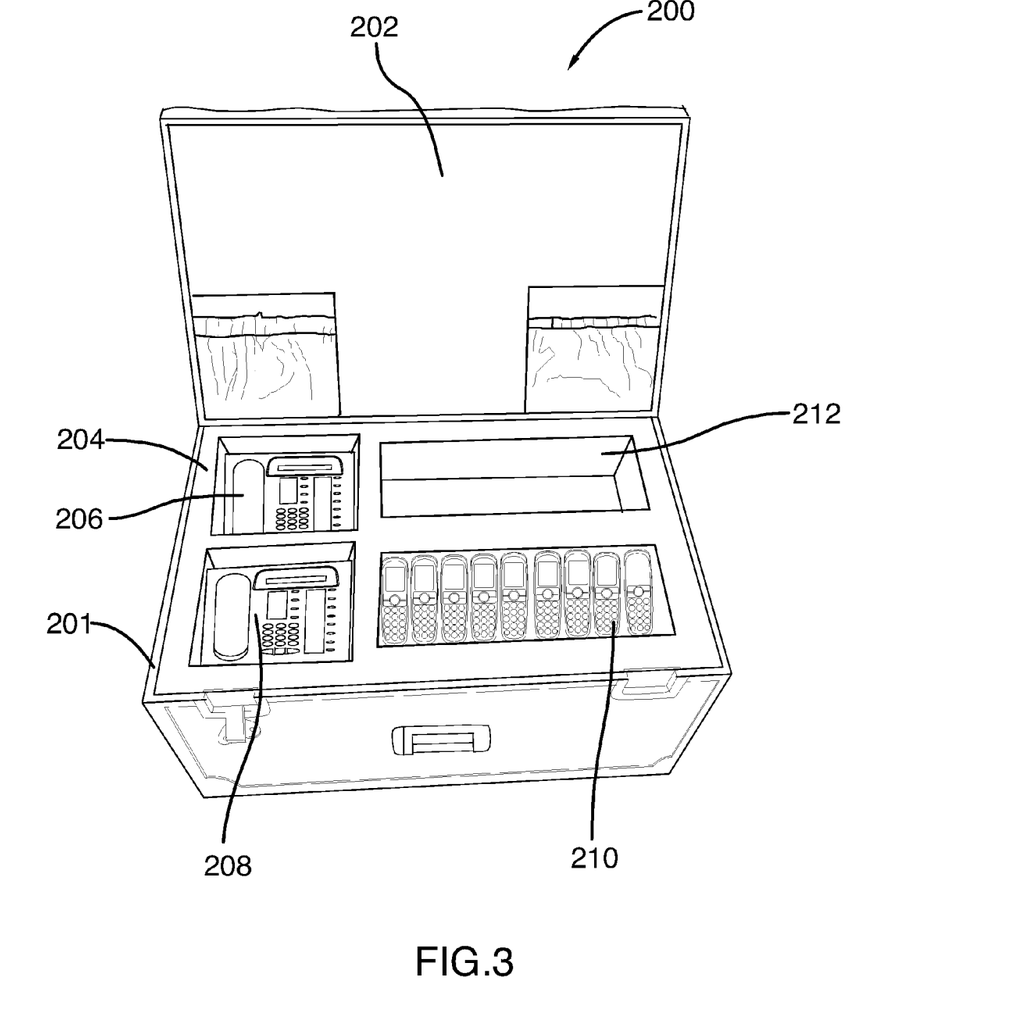
FIG. 3 is a picture which shows a first embodiment of a transportable telecommunication system.

Now referring to FIG. 3, there is shown a first embodiment of a transportable telecommunication system 200.

In this embodiment, the transportable telecommunication interconnection device 200 comprises a transportable enclosure 201.

The transportable enclosure 201 comprises a first compartment hidden from the user.

The transportable enclosure 201 further comprises a second compartment located above a separation wall (not shown). A removable tray 204 sized and shaped to fit in the second compartment is positioned within the second compartment. The tray 204 comprises a plurality of recesses each sized and shaped for receiving at least one communication device therein. In this embodiment, the tray 204 comprises a first recess adapted to receive a first digital key phone 206 therein, a second recess for receiving a second digital key phone 208 therein, and a further recess for receiving a plurality of wireless phones 210 therein.

The tray 204 further comprises a multi-purposes recess 212. The multi purposes recess 212 may be used for various purposes such as for instance for storing documents or spares.

In this embodiment, the input and output port connectors (not shown) are secured through the separation wall (not shown), and they may be accessed by removing the tray 204. Then, the communication devices may be connected to a respective output port connector, and at least one of the input port connector may be connected to a network.

The skilled addressee will appreciate that various alternative embodiments may be possible for the tray 204 as further shown below.

It will be appreciated that each of the first key phone 206, the second digital key phone 208 and the plurality of wireless phones 210 may be operatively connected to the processing device located in the first compartment. Moreover and as, shown, each of the second digital key phone 208 and the plurality of wireless phones 210 is placed in the third recess of the tray 204.

It will be further appreciated that in the embodiment disclosed a third compartment is provided in the cover. The third compartment is hidden from the user using planar separation member 202.

Figure 4:
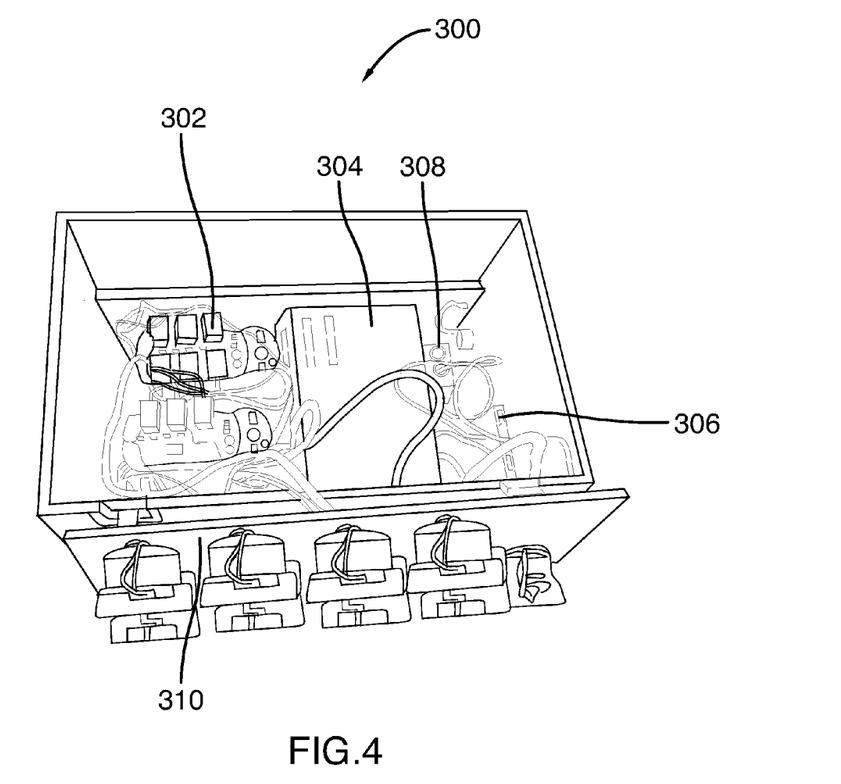
FIG. 4 is a picture which shows a first embodiment of a transportable telecommunication system wherein a first compartment is shown.

Now referring to FIG. 4, there is shown another embodiment of a transportable telecommunication interconnection device from which the tray and the separation wall has been removed.

In this embodiment, the transportable telecommunication interconnection device 300 comprises a first compartment comprising power bars 302, communication system 304, an electric plug with on/off switch 308, a signal booster 306 and a patch panel (not shown) for the communication system 304.

It will be appreciated that in this embodiment, the separation wall 310 has been removed for the purpose of showing the inside of the first compartment. It will also be appreciated that the tray fitting in the second compartment 204 has also been removed.

Figure 5:
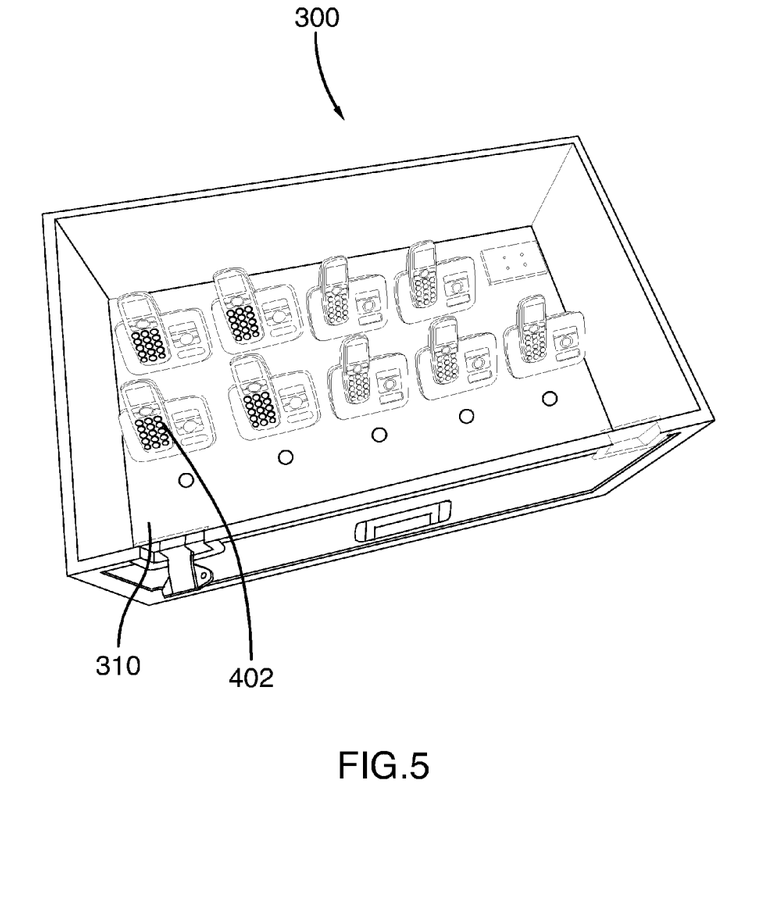
FIG. 5 is a picture which shows the first embodiment of a transportable telecommunication system wherein the first compartment is hidden.

Now referring to FIG. 5, there is shown the embodiment disclosed in FIG. 4 with the separation wall 310 removably secured within the chamber of the transportable enclosure. In this case, the first compartment is therefore hidden from the user.

Still in this embodiment, the separation wall 310 supports inter alia nine (9) cordless phone bases 402 that are each connected to a respective output port connector. The skilled addressee will appreciate that various alternative embodiments may be possible depending on a configuration sought.

Figure 6:
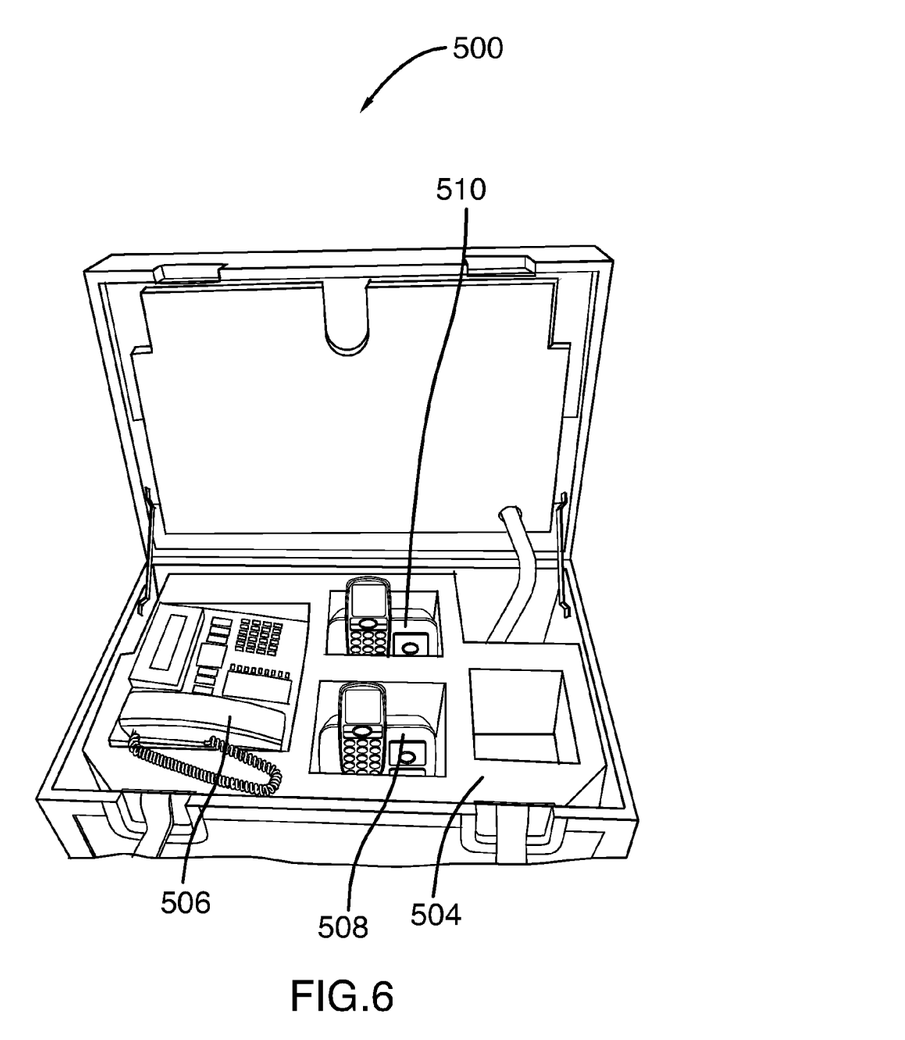
FIG. 6 is a picture which shows a second embodiment of a transportable telecommunication system wherein a first compartment is hidden.

Now referring to FIG. 6, there is shown another embodiment of a transportable telecommunication interconnection system 500.

In this embodiment, the transportable telecommunication system 500 comprises a tray 504. The tray 504 is shaped to so as to receive inter alia an IP phone 506, a first cordless phone base 508 and a second cordless phone base 510, which are each connected to a respective output port (not shown). Furthermore, the tray 504 is fixedly secured within the first or open compartment of the transportable telecommunication interconnection system 500. While in the embodiment illustrated in FIG. 6 it is fixedly secured within the transportable enclosure, it should be understood that the tray 504 may be removably secured within the transportable enclosure.

Figure 7:
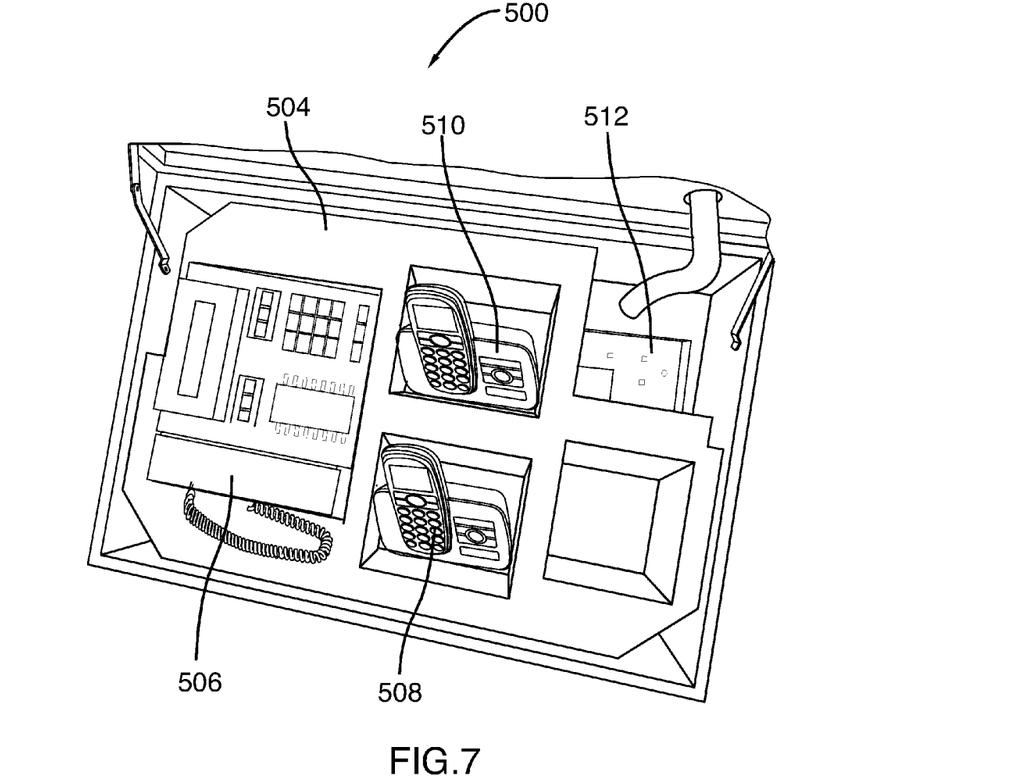
FIG. 7 is a picture which shows a top plan view of the second embodiment of a transportable telecommunication system shown in FIG. 5.

Now referring to FIG. 7, there is shown the embodiment shown in FIG. 6. The skilled addressee will appreciate that the removable tray 504 further comprises a recess for receiving plugs 512 for connecting the transportable telecommunication system to anyone of a PSTN network, a local area network (LAN), or the like.

Figure 8:
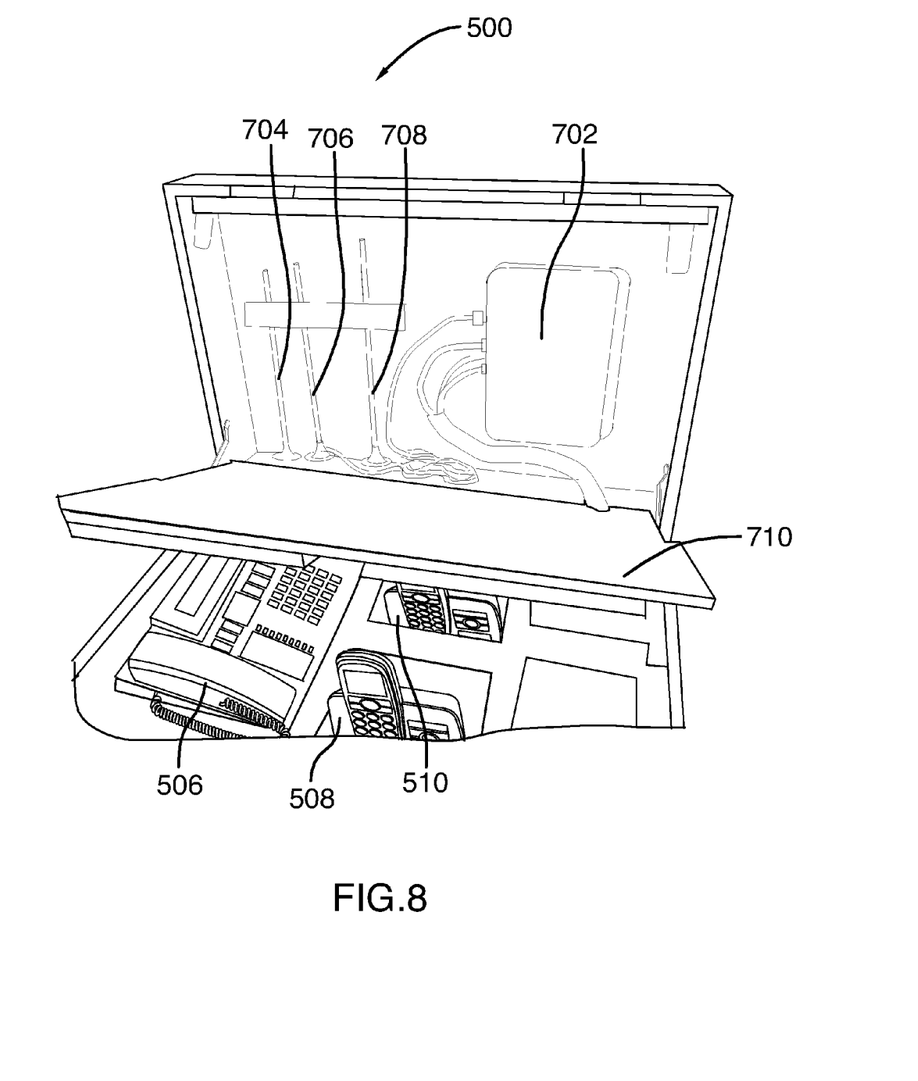
FIG. 8 is a picture which shows a front perspective view of the second embodiment of a transportable telecommunication system, shown in FIGS. 5 and 6, wherein a third compartment is shown.

Now referring to FIG. 8, there is shown the transportable telecommunication interconnection system 500 disclosed in FIGS. 6 and 7, wherein the third compartment contained in the cover has been made visible by partially removing the planar separation 710.

As shown in FIG. 8, the third compartment comprises a WiFi 3G router 702 as well as 3G antennas 704, 706, 708, which are all operatively connected to the processing device contained in the first compartment. The skilled addressee will appreciate that the WiFi 3G router 702 as well as the 3G antennas 704, 706, 708 are operatively connected to the telecommunication system located in the first compartment. In an alternative embodiment, the WiFi 3G router 702 as well as the 3G antennas 704, 706, 708 are located in the first compartment.

Figure 9:
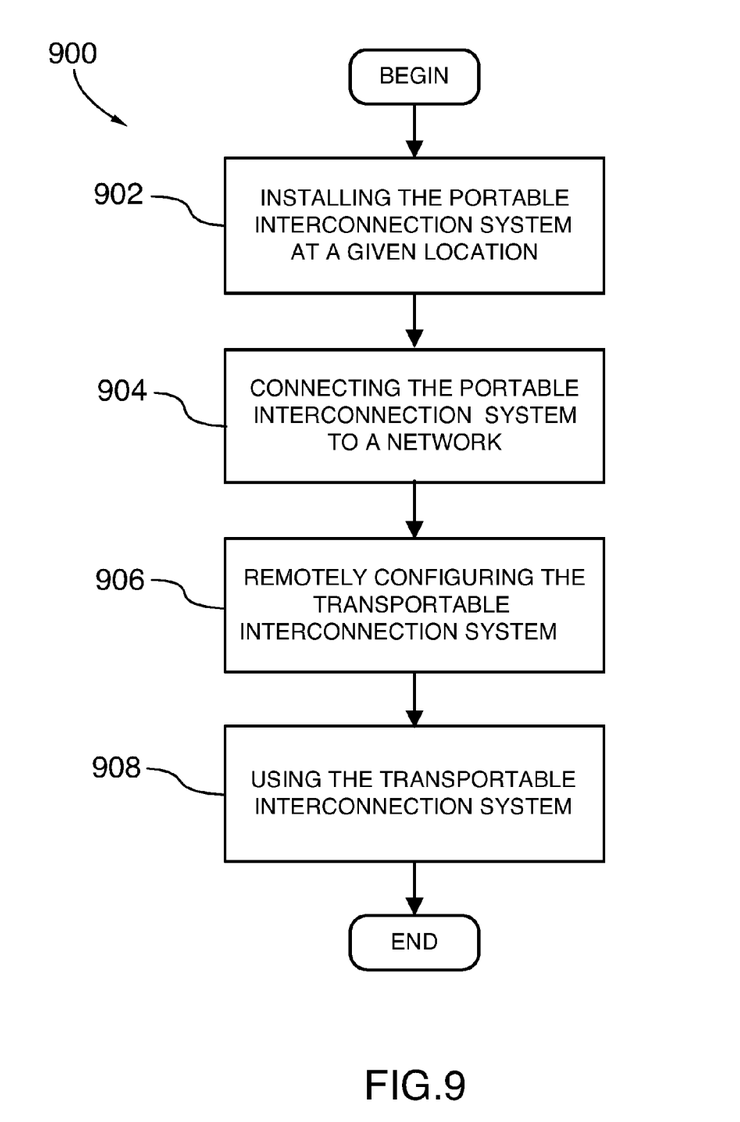
FIG. 9 is a flowchart which shows how to operate the transportable communication system in accordance with an embodiment.

Now referring to FIG. 9, there is shown how the transportable telecommunication interconnection system is used in accordance with one embodiment.

According to processing step 902, the transportable telecommunication interconnection system is provided and installed at a given location. The skilled addressee will appreciate that the transportable telecommunication interconnection system may be installed at various remote locations in which there is a need for a telecommunication system such as for instance in areas that had faced a disaster or a temporary office.

It will be appreciated that the installation of the transportable telecommunication interconnection system may comprise connecting the transportable telecommunication system to an electrical grid or any other power source. Alternatively, the transportable telecommunication interconnection system may be provided with an internal battery for powering at least the processing device. The battery may be located within the first compartment of the transportable enclosure which is further provided with a connector for charging the battery.

In one embodiment, it will be appreciated that having a battery may be of great advantage. In fact, in case of a power outage, the battery will ensure the transportable telecommunication system can still be used for an extra given period of time. Also, it will be appreciated by the skilled addressee that the transportable telecommunication system may be connected to a power generator instead of an electrical grid.

According to processing step 904, the transportable telecommunication interconnection system is connected to a telecommunication network. It will be appreciated that the network may be anyone of a cellular, PSTN or IP network through 3G router, satellite network, or standard landline Internet access.

According to processing step 906, the transportable telecommunication interconnection system is remotely configured. It will be appreciated that the remote configuration is performed in situ once the transportable telecommunication interconnection system is connected to a telecommunication network in one embodiment.

It should be understood that the step 906 of remotely configuring the processing device of the transportable telecommunication interconnection system may be omitted if the processing device is pre-configured. In this case, the configuration is performed prior providing the transportable telecommunication interconnection system. The skilled addressee will appreciate that this is of great advantage since the user does not have to configure the transportable telecommunication interconnection system per se.

Furthermore and in one embodiment, the fact that the first compartment is hidden from the user removes stress and complexity to a user receiving the transportable enclosure.

According to processing step 908, at least one communication device is connected to a corresponding output port connector and the transportable telecommunication interconnection system may be used. Depending on the configuration provided various communication devices may be used such as wireless phones, digital key phones, etc. Alternatively, a connection may be provided to a local area network (LAN) using a WiFi router or RJ45 based connection. The skilled addressee will appreciate that the various communication devices may be connected to the transportable telecommunication interconnection system which may be of great advantage.

The skilled addressee will appreciate that the embodiments disclosed herein are of great advantages for various reasons.

First of all and in one embodiment, it will be appreciated that hiding the communication system from the user may be of great advantage since it removes the complexity of having to set the telecommunication system.

In one embodiment, another advantage of the transportable telecommunication system disclosed herein is that a user has only access to a minimum amount of elements. In fact, users do not need to have extensive skills for operating the transportable telecommunication system.

In an embodiment in which the configuration is performed remotely, the skilled addressee will appreciate that this is of great advantage since it will help reducing the cost of implanting this transportable telecommunication system at a location by saving on the transport of a skilled technician to the location.

Figure 10:
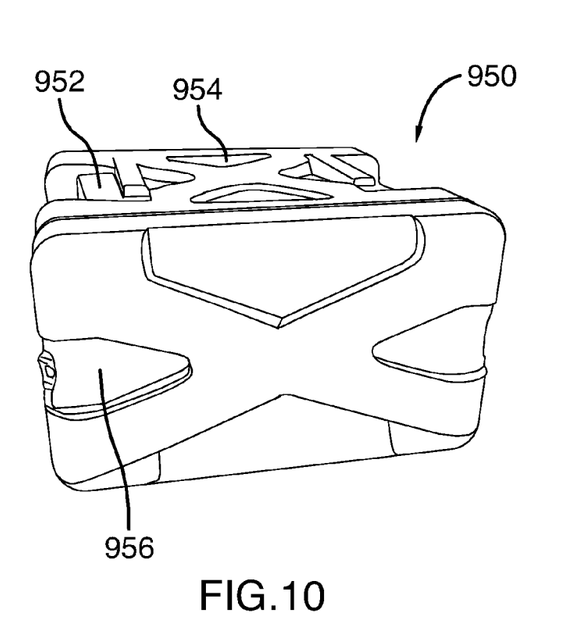
FIG. 10 is a picture which shows the further embodiment of a transportable telecommunication system comprising two covers.

FIG. 10 illustrates a further embodiment of a transportable telecommunication interconnection device 950 comprising a transportable enclosure 952 which defines an internal chamber. A first cover 954 is removably secured to the transportable enclosure in order to removably close the internal chamber. A second cover 956, opposite to the first cover 954, is removably secured to the transportable enclosure 952 at the end opposite to the first cover 952 in order to protect the base wall (not shown) of the transportable enclosure 950.

Figure 11:
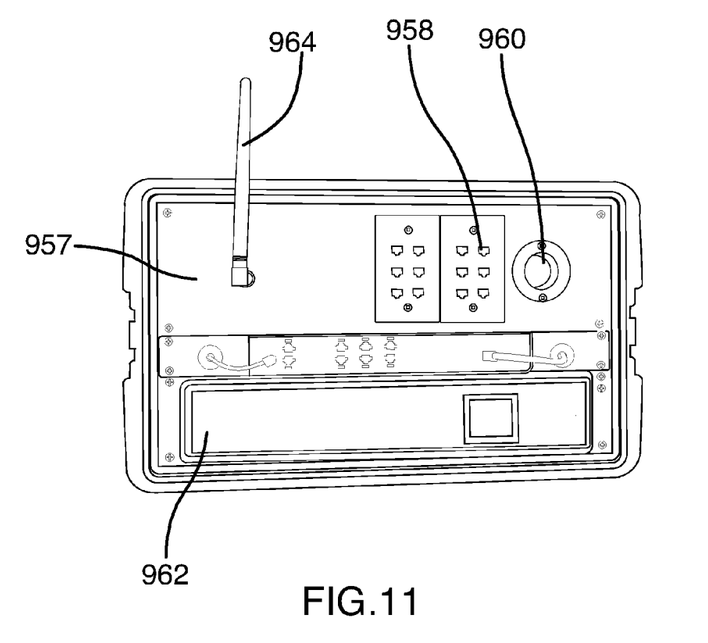
FIG. 11 is a picture which shows the transportable telecommunication system of FIG. 10 with the first cover removed.

FIG. 11 illustrates the transportable telecommunication interconnection device 950 from which the second cover 956 has been removed to show the base wall 956. A set of input and output port connectors 958 for connecting a telecommunication network and at least one communication device to the processing device (not shown) extend from the base wall 957. An electrical plug 960 for powering at least the processing device also extends from the base wall 957. A battery 962 is also secured to the base wall 957. The battery 962 is electrically connected to the processing device for powering it. An antenna 964 also extends from the base wall 957 and is operatively connected to the processing device. In one embodiment, the antenna 964 is rotatably secured to the base wall 957 in order to rotate it to secure the cover 956 to the transportable enclosure 952. In another embodiment, the antenna 964 is removably secured to a connector extending through the base wall 957 and connected to the processing device 104.

Figure 12:
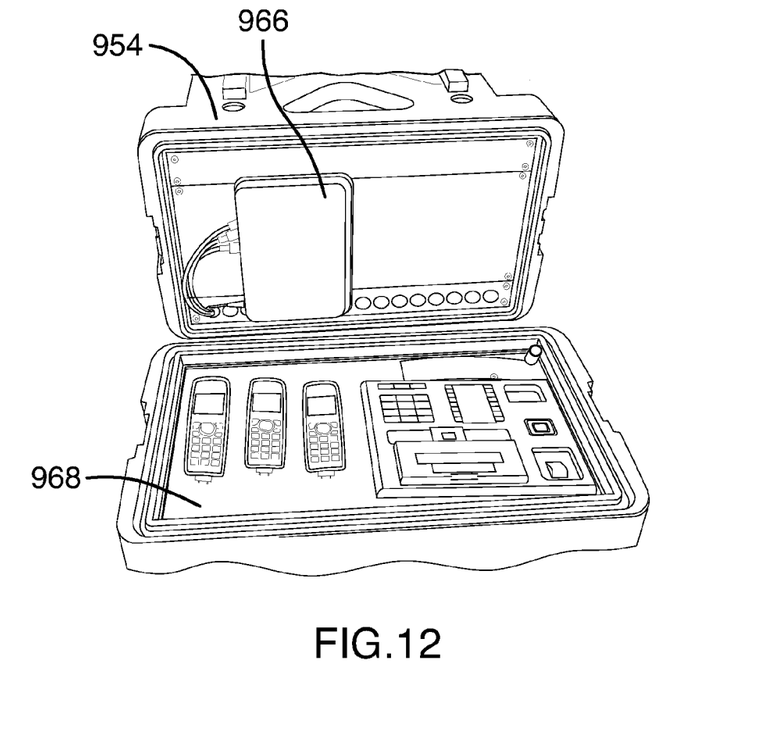
FIG. 12 is a picture which shows the transportable telecommunication system of FIG. 10 with the second cover removed.

FIG. 12 illustrates the transportable telecommunication interconnection device 950 when the cover 954 is partially opened. The cover 954 comprises a compartment in which a WiFi router 966 is secured. The WiFi router 966 is in communication with the processing device contained within the transportable telecommunication interconnection device 950. Furthermore, a tray 968 is inserted into the chamber of the transportable enclosure 952. Communication devices such as a digital key phone and wireless phones.

In one embodiment, the transportable enclosure has the shape of a suitcase. In another embodiment, the transportable enclosure has the shape of a trunk. In a further embodiment, the transportable enclosure has the shape of a chest.

Although the above description relates to a specific preferred embodiment as presently contemplated by the inventor, it will be understood that the invention in its broad aspect includes mechanical and functional equivalents of the elements described herein.

The invention claimed is:

1. A transportable telecommunication interconnection device for interconnecting a plurality of communication devices to a telecommunication network, comprising:
    a transportable enclosure comprising an end wall and a peripheral wall extending along an axis from the end portion and defining a chamber, the transportable enclosure further comprising a separation wall positioned within the chamber at a given position along the axis to define an enclosed compartment and an open compartment within the chamber, the open compartment being configured to receive therein at least one of the plurality of communication devices;
    a chamber cover for removably closing the open compartment;
    input and output port connectors extending through at least one wall defining the enclosed compartment, the input port connectors for connection to the communication network and the output port connectors for connection to the plurality of communication devices; and
    a processing device positioned within the enclosed compartment, connected to the input and output ports, and configured for interconnecting the input port connectors to the output port connectors.

2. The transportable telecommunication interconnection device of claim 1, wherein the chamber cover is hingedly secured to the transportable enclosure.

3. The transportable telecommunication interconnection device of claim 1, wherein the chamber cover is provided with a recess, the recess facing the open compartment when the chamber cover is removably secured to the transportable enclosure.

4. The transportable telecommunication interconnection of claim 3, wherein the recess is sized and shaped for receiving one of a router and an antenna combiner to be operatively connected to the processing device.

5. The transportable telecommunication interconnection of claim 1, wherein at least one of the output port connector is adapted for connection to a data network.

6. The transportable telecommunication interconnection of claim 1, wherein the communication devices comprise at least one of an analog phone, a digital key phone, an IP phone, and a two-way radio.

7. The transportable telecommunication interconnection of claim 1, wherein the input and output port connectors extend through the separation wall.

8. The transportable telecommunication interconnection of claim 1, wherein the input and output port connectors extend through the end wall.

9. The transportable telecommunication interconnection of claim 8, further comprising a further cover removably securable on top of the end wall for protecting the input and output port connectors.

10. The transportable telecommunication interconnection of claim 1, further comprising a tray member removably insertable within the open compartment.

11. The transportable telecommunication interconnection of claim 1, further comprising a tray member fixedly secured within the open compartment.

12. The transportable telecommunication interconnection of claim 10, wherein the tray member comprises a plurality of recesses each shaped and sized for receiving at least a respective one of the communication devices.

13. The transportable telecommunication interconnection of claim 1, wherein the transportable enclosure is further provided with wheels.

14. The transportable telecommunication interconnection of claim 1, wherein the transportable enclosure is further provided with at least one handle.

15. The transportable telecommunication interconnection of claim 1, wherein the processing device is configured for converting telecommunication formats.

16. The transportable telecommunication interconnection of claim 15, wherein the processing device is pre-configured.

17. The transportable telecommunication interconnection of claim 15, wherein the processing device is remotely configurable upon connection to the telecommunication network.

18. The transportable telecommunication interconnection of claim 1, wherein the telecommunication network comprises one of a mobile network, a Public Switching Telephone Network, an Internet Protocol network, an Integrated Services Digital Network, and a Basic Rate Interface Network.

19. A transportable telecommunication interconnection system for interconnection to a telecommunication network, comprising:
a plurality of communication devices;
a transportable enclosure comprising an end wall and a peripheral wall extending along an axis from the end portion and defining a chamber, the transportable enclosure further comprising a separation wall positioned within the chamber at a given position along the axis to define an enclosed compartment and an open compartment within the chamber;
a chamber cover for removably closing the open compartment;
input and output port connectors extending through at least one wall defining the enclosed compartment, the input port connectors for connection to the communication network and the output port connectors for connection to the plurality of communication devices; and
a processing device positioned within the enclosed compartment, connected to the input and output ports, and configured for interconnecting the input port connectors to the output port connectors.

20. The transportable telecommunication interconnection system of claim 19, further comprising a tray member removably insertable within the open compartment, the tray member comprising a plurality of recesses each shaped and sized for receiving at least a respective one of the communication devices.

21. A method for interconnecting a communication device to a telecommunication network, comprising:
providing a transportable telecommunication interconnection device comprising:
a transportable enclosure comprising an end wall and a peripheral wall extending along an axis from the end portion and defining a chamber, the transportable enclosure further comprising a separation wall positioned within the chamber at a given position along the axis to define an enclosed compartment and an open compartment within the chamber;
a chamber cover for removably closing the open compartment;
input and output port connectors extending through at least one wall defining the enclosed compartment, the input port connectors for connection to the communication network and the output port connectors for connection to the plurality of communication devices; and
a processing device positioned within the enclosed compartment, connected to the input and output ports, and configured for interconnecting the input port connectors to the output port connectors;
connecting the telecommunication network to a respective one of the input port connectors; and
connecting the communication device to one of a respective one of the output port connectors.

* * * * *